(12) United States Patent
Karpman et al.

(10) Patent No.: US 11,601,694 B1
(45) Date of Patent: Mar. 7, 2023

(54) REAL-TIME CONTENT DATA PROCESSING USING ROBUST DATA MODELS

(71) Applicant: Castle Global, Inc., San Francisco, CA (US)

(72) Inventors: Dmitriy Karpman, San Francisco, CA (US); Kevin Guo, San Francisco, CA (US); Ryan Weber, San Francisco, CA (US)

(73) Assignee: CASTLE GLOBAL, INC., San Francisco, CA (US)

( * ) Notice: Subject to any disclaimer, the term of this patent is extended or adjusted under 35 U.S.C. 154(b) by 0 days.

(21) Appl. No.: 17/544,644

(22) Filed: Dec. 7, 2021

Related U.S. Application Data

(60) Provisional application No. 63/259,901, filed on Nov. 16, 2021, provisional application No. 63/244,655, filed on Sep. 15, 2021.

(51) Int. Cl.
| | | |
|---|---|---|
| *H04N 21/23* | (2011.01) | |
| *H04N 21/234* | (2011.01) | |
| *H04N 21/235* | (2011.01) | |
| *G06V 20/70* | (2022.01) | |
| *G06V 20/40* | (2022.01) | |
| *G10L 15/08* | (2006.01) | |

(52) U.S. Cl.
CPC ... *H04N 21/23418* (2013.01); *H04N 21/2353* (2013.01); *G06V 20/41* (2022.01); *G06V 20/70* (2022.01); *G10L 15/08* (2013.01)

(58) Field of Classification Search
None
See application file for complete search history.

(56) References Cited

U.S. PATENT DOCUMENTS

| | | | |
|---|---|---|---|
| 2003/0028873 A1* | 2/2003 | Lemmons | H04N 21/25883 348/588 |
| 2008/0168490 A1* | 7/2008 | Yu | H04N 7/165 704/235 |
| 2012/0096488 A1* | 4/2012 | Wei | H04N 21/47202 725/34 |
| 2012/0134576 A1 | 5/2012 | Sharma | |
| 2014/0007150 A1* | 1/2014 | Bhide | H04N 21/84 725/14 |
| 2014/0157328 A1* | 6/2014 | Roberts | G06Q 30/02 725/61 |
| 2016/0037217 A1* | 2/2016 | Harmon | H04N 21/4542 725/9 |
| 2017/0201793 A1 | 7/2017 | Pereira | |
| 2017/0263029 A1 | 9/2017 | Yan | |
| 2018/0084310 A1 | 3/2018 | Katz | |
| 2019/0373322 A1* | 12/2019 | Rojas-Echenique | H04N 21/2187 |
| 2020/0159871 A1 | 5/2020 | Bowen | |
| 2021/0044640 A1* | 2/2021 | He | G10L 15/26 |
| 2021/0117869 A1 | 4/2021 | Plumbley | |

(Continued)

*Primary Examiner* — Cai Y Chen
(74) *Attorney, Agent, or Firm* — Mahamedi IP Law LLP

(57) ABSTRACT

A system stores a plurality of data models, each data model being configured to sort datasets based on a set of criteria unique to the data model. The system further identifies a plurality of content streams on a plurality of content streaming platforms. The system then executes each data model of the plurality of data models on each content stream of the plurality of content streams to generate a labeled content file of each content stream of the plurality of content streams.

20 Claims, 6 Drawing Sheets

(56) References Cited

U.S. PATENT DOCUMENTS

2021/0166028 A1   6/2021   Govindaraju
2021/0327421 A1   10/2021  Beaufays

* cited by examiner

REAL-TIME CONTENT DATA PROCESSING USING ROBUST DATA MODELS

CROSS REFERENCE TO RELATED APPLICATION

This application claims the benefit of priority to U.S. Provisional Application No. 63/244,655, filed on Sep. 15, 2021, and claims the benefit of U.S. Provisional application Ser. No. 63/259,901, filed Nov. 16, 2021, which applications are hereby incorporated by reference in their entireties.

BACKGROUND

The management and understanding of large amounts of structured and unstructured content and data has become increasingly complex as data creation and acquisition continues to be rampant in the information technology fields. Machine learning models can be developed and trained to extract meaning from data such that usefulness from large scale data acquisition may be realized.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
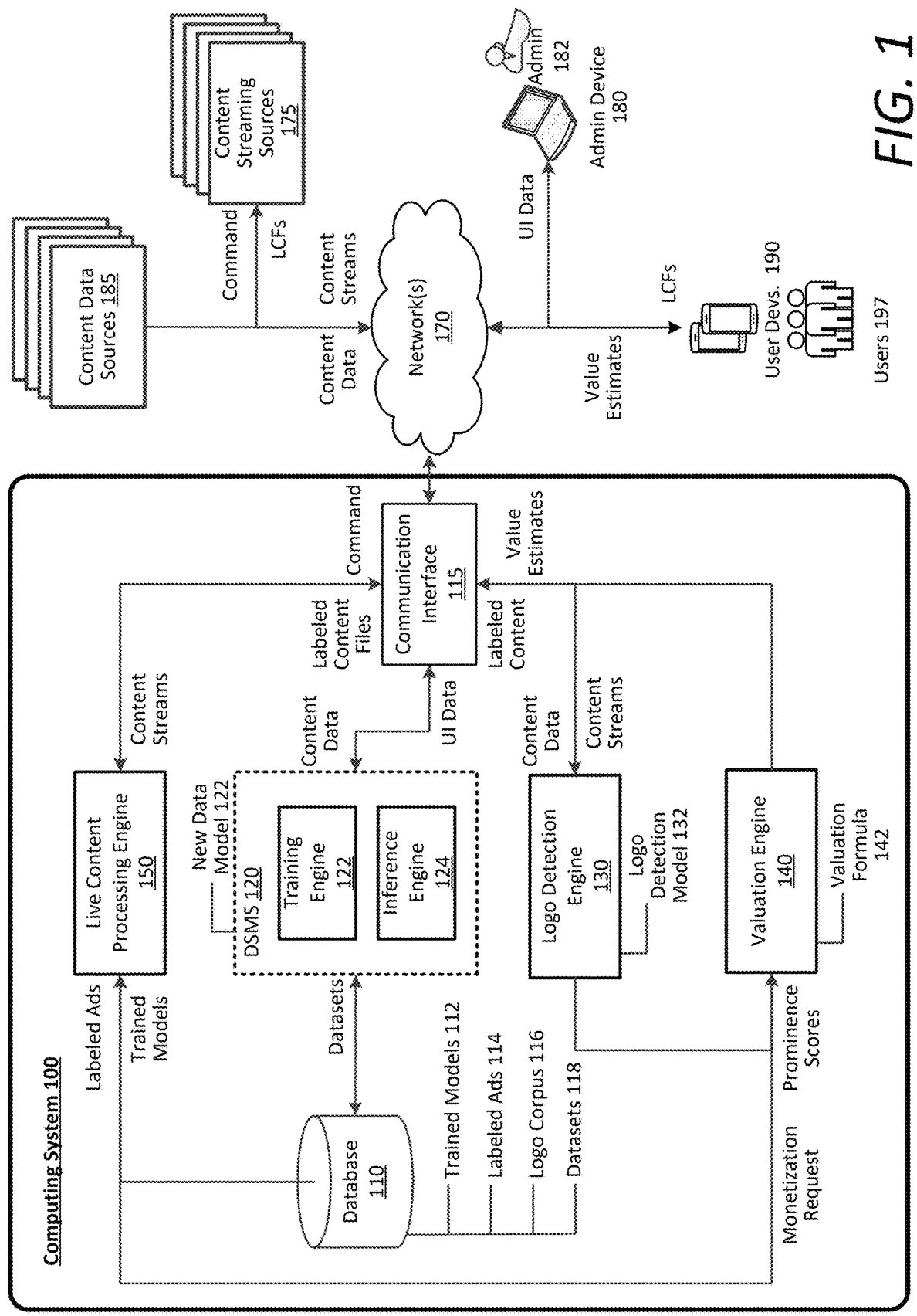
FIG. 1 is a block diagram illustrating an example computing system implementing model training, data management, and model execution techniques, in accordance with examples described herein.

Initial data model building and training may involve various manual processes in which humans may be employed to provide labels, bounding boxes or polygons around particular image objects, or provide object selections for automatic labeling. In various scenarios, video content or image content is provided to multiple humans for manual processing to achieve increased accuracy and consensus. In certain implementations, when a desired level of accuracy and/or model robustness is achieved, a computing system can utilize trained data models to train other models. For example, in video content, an initial model may be trained to identify any automobile in the video content. A customer may require a new data model to identify a specific type of vehicle in video content (e.g., taxi cabs). Accordingly, the initial model may first be utilized to detect and label all vehicles in video content, and subsequent manual processing may be performed on the labeled vehicles to identify all instances of the specific type of vehicle in the video content. Performing such automated labeling processes using existing models and manual processing to create a new data model (e.g., a data model that can identify and label all taxi cabs in any video content stream) can yield more and more useful data models that may be used to further train new data models.

According to examples described herein, a dataset management system can comprise a platform for creating, training, evaluating, and improving upon new data models. In some examples, the system can leverage highly accurate, existing data models to determine training datasets (e.g., video, images, audio, etc.) that can increase the robustness of the new data model. The set of criteria for a new data model can include classifying and/or labeling content elements for various uses, such as content moderation (e.g., identifying, labeling, and/or classifying "not-safe-for-work" (NSFW) content, such as nudity, violence, drug use, etc. in content data), demographic classification (e.g., determining gender and age of users on certain platforms in real-time), logo or brand detection (e.g., for sponsorship analytics and/or monetization), object and scene detection, and the like.

As provided herein, the system can execute supervised machine learning in a training phase for the new data model by utilizing training data sets (e.g., ground truth datasets) that have been previously labeled, either automatically by a trained model or manually by a user. A new model having a set of criteria (e.g., identifying and classifying a particular object or element in content data) can be executed on the trained dataset and a robustness score (e.g., an accuracy score indicated in a precision recall (PR) curve or in tabular form) for the new data model can be outputted by the system. When the robustness score is below a first robustness threshold, the new data model can be adjusted to identify any false positive or false negative results and the training phase can be repeated using a trained dataset until the first robustness threshold is met.

As provided herein, a training dataset can comprise content (e.g., images, video, audio, etc.) that has been previously labeled, either manually by human users or automatically by a trained data model. For example, humans may be provided with tasks to provide labels for a series of images, such as classifying an image as NSFW, inputting a bounding box around specific objects or selecting such objects (e.g., logos in the images), inputting labels for specific objects (e.g., typing a name for the object), and the like. In certain examples, the content labels inputted by the humans or trained models may be provided in metadata of the content data, which can comprise a ground truth for training new data models. Accordingly, a new data model can be executed on the training dataset and can be effectively evaluated and improved upon.

As further provided herein, the first robustness threshold can comprise a threshold at which the new data model may be executed on an evaluation dataset comprising unlabeled content data (e.g., content data from publicly available content data sources). In some examples, the first robustness threshold may be arbitrary and dependent on the nature of the new data model and the training datasets on which the new data model is executed. In variations, the first robustness threshold can correspond to a specified accuracy score (e.g., 90% accuracy) at which the new data model can be executed on evaluation datasets.

As such, once the first robustness threshold is met for a new data model, the new data model may be executed on unlabeled, evaluation datasets. The evaluation datasets may comprise preselected content for continued training and improving, or may be randomized content on a particular platform or publicly available content on the Internet. In the evaluation phase, a robustness score for the new data model may be outputted by the system, which can be utilized to adjust and improve upon the new data model (e.g., indicate false positives and false negatives to the model). The system can generate a customized user interface that enables a user to make adjustments to the new data model, select datasets for execution of the new data model, view robustness scores for the new data model, configure the execution of the new data model on particular datasets, and the like.

When the new data model meets a second robustness threshold (e.g., 99% accurate or human-level accuracy), the new data model can be considered a trained data model that may be executed on any content data. The trained data model can automatically label the content data based on the set of criteria of the trained data model. In various implementations, the trained data model can be combined with other trained models having their own sets of criteria to create a data model suite that can be used for large scale content labeling or filtering tasks, such as content moderation for video streaming platforms. In the content moderation example, a multi-headed model comprising a set of trained data models—each having its own set of criteria—can be executed on streaming content. For example, a first trained data model in the multi-headed model can have a set of criteria for identifying and/or classifying nudity, a second model can have a set of criteria for identifying and/or classifying violent behavior, a third model can have a set of criteria for identifying and/or classifying offensive language, a fourth model can have a set of criteria for identifying weapons, and so on. In further examples, the set of trained data models can be used to process audio, images, text, comments, etc.

In various examples, the trained data model(s) can output a labeled content file which can comprise the content data with labels included (e.g., in metadata and/or as altered content features in the content data). Additionally or alternatively, the trained data model can cause automatic, real-time actions to be triggered for content streams, such as automatically shutting down a content stream when NSFW content is detected, or automatically transmitting a notification to a streaming platform provider.

In various implementations, the system can store a plurality of trained data models, each configured to identify, label, and/or classify specified objects, behaviors, or actions in content data. In various implementations, the system can proactively execute the trained models on real-time content streams to perform real-time actions. For example, execution of the trained models on live content streams can output a labeled content file with metadata indicating everything in the content stream that the trained models have classified and labeled. In such examples, the labeled content file may be utilized to, for example, monetize certain aspects of the content stream (e.g., a detected music track, identified products and/or logos, and the like).

In further examples, the trained models can output information about the content stream that can be utilized for real-time advertisement selection decisions. In one implementation, the advertisement selection decisions may be agnostic to the viewer, such that no personal user information is used to make real-time advertisement selections. In such an implementation, the trained models may output classifications and labels for a content stream that can indicate one or more themes of the content stream (e.g., a theme relating to the outdoors, camping, hiking, mountains, etc.), and the system can infer a product interest of the viewer based on such identified themes. The system may then perform a lookup in an advertisement database having thematic labels to identify a matching advertisement to the one or more themes determined for a current content stream. In real-time, the system can select a matching advertisement for presentations on, for example, a video advertisement break in the content stream or an HTML5 panel adjacent to the content stream.

In certain examples, the system can execute a logo detection model on content data, which can identify and label all brand logos in the content data. The system can include a database storing a corpus of logos, which may be labeled in terms of the logo's owner and/or a brand name for the logo. The logo detection model can be executed on content data, such as streaming videos, images, and audio, and can automatically detect logos in real-time and the system can perform one or more actions upon detecting each logo. In one example, the system can automatically alter the content data to input a bounding box or polygon around the detected logo and include a name or owner of the logo in the content data, or otherwise hyperlink or tag a person, entity or account to the area or use of the detected logo. Additionally or alternatively, the logo detection model can automatically blur the logo or replace the logo with a content item (e.g., a different logo or image).

In various implementations, the system can perform sponsorship or value analytics on content data based on the detected logos. For example, an owner of a brand having one or more logos may wish to determine a monetary value of on-air exposure of its logos (e.g., during a sporting event or over the course of a sporting season). The logo detection model can detect the logo(s) of the brand owner in select content, determine a prominence score for each instance of logo detection, and the system generate a cumulative value of the brand owner's logo(s) for the selected content (e.g., based on viewership information). Additionally or alternatively, the logo detection model can provide a prospective sponsor with a brand exposure valuation using historical content. For example, the system can execute the logo detection model on previously aired content and the system can generate an estimated value for the theoretical exposure of the logo in the previously aired content, which can be used for determining a value for a new sponsorship agreement.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with a computing system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, as a computer-implemented method, and/or via machine learning techniques employing artificial intelligence and/or convolutional neural networks. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples include processors and various forms of memory for holding data and computer-executable instructions (including machine learning instructions and/or artificial intelligence instructions).

Examples of computer-readable mediums include permanent memory storage devices, such as hard drives on personal computers or servers. Other examples of computer storage mediums include portable storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system 100 implementing model training, data management, and model execution techniques, in accordance with examples described herein. The computing system 100 can include a communication interface 115 that connects the computing system 100 to user devices 190, content streaming sources 175, and content data sources 185 over one or more networks 170. As provided herein, the content data sources 185 can comprise any database that includes recorded content, such as audio files, images, and video files, that are accessible over the one or more networks 170. The content streaming sources 175 can comprise audio and/or video streaming platforms (e.g., social media streams, television streams, online video and/or radio services, etc.) accessible by the computing system 100 over the one or more networks 170.

In various implementations, the computing system 100 can include a database 110 comprising a number of trained data models 112, a labeled advertisement corpus 114, a logo corpus 116, and a number of labeled datasets 118 used for training new data models. The labeled datasets 118 can comprise ground truth content that has been processed by individuals or trained models 112 such that objects, behaviors, actions, specified words, etc. have been identified and labeled and/or classified accordingly. For example, a labeled dataset 118 can comprise a set of images in which all NSFW content has been selected, identified, labeled and/or classified accordingly.

In such an example, the images may have been presented to a group of individuals to classify images as having nudity or violence, and/or identify and label particular aspects of NSFW content in each image. In order to achieve consensus, previously labeled images may be presented to multiple individuals for labeling, so that the dataset 118 can comprise content that has been accurately labeled. In a further example, the dataset 118 may also be processed by a trained data model 112, which can automatically perform the same or similar labeling operations has the human individuals, resulting in an accurately labeled, ground truth dataset 118 that may be utilized to trained new data models 122.

In various implementations, the computing system 100 can include a dataset management system 120 comprising a training engine 122 that can communicate with an administrator device 180 over the one or more networks 170 to enable an administrator 182 to configure and refine the new data model 122, and an inference engine 124 that allows for the execution of the new data model 122 on content data and content streams from any number of content data sources 185 or content streaming sources 175. The dataset management system 120, database 110 comprising trained models 112 and labeled datasets 118, and a customized user interface presented on the administrator device 180 can comprise a set of features that optimizes the training of new data models 122. An administrator 182 (e.g., an individual in a machine learning team) can operate the administrator device 180 via the customized user interface that enables the administrator 182 to select new data models 122 for training, select labeled datasets 118 on which to execute the new data model 122, provide refinements and configurations to the new data model 122 (e.g., identify instances of false positives or false negatives for the new data model 122), execute one or more trained data models 112 on content data to obtain new training datasets, and view robustness scores indicating an accuracy of the new data model 122 (e.g., shown on a precision recall curve).

In various implementations, the administrator 182 can cause the dataset management system 120 to execute the new data model 122 on a selected dataset 118. As described herein, the new data model 122 is configured to identify, label, and/or classify certain objects, symbols, behaviors (e.g., NSFW behavior), actions (e.g., violent actions), themes or scenes (e.g., sporting content, oceanic or outdoor themes, urban or rural themes, etc.), and the like. Accordingly, based on the criteria of the new data model 122—which can comprise the specific task(s) that the new data model 122 is configured to perform on content data—the dataset management system 120 can output a robustness score for the new data model 122 subsequent to execution on the selected dataset 118.

In certain examples, the dataset management system 120 can output user interface data to the administrator device 180 to present the robustness score to the administrator 182 and enable the administrator 182 to refine the new data model 122. The user interface data can also cause the administrator device 180 to present instances of false positives and false negatives, which correspond to instances in which the new data model 122 identified, labeled, or classified an element in the content data incorrectly, or when the new data model 122 failed to identify, label, or classify aspects of the select dataset 118 in accordance with its set of criteria. The dataset management system 120 can indicate to the new data model 122 each instance of a false positive or false negative, such that the new data model 122 becomes more and more robust.

In further examples, the dataset management system 120 can track all changes made to the new data model 122 for each iteration of execution on the datasets 118, such that the administrator 182 can determine whether a particular change improved or did not improve the new data model 122. The administrator 182 may make adjustments to or otherwise refine the new data model 122 using the tracking features of the dataset management system 120. For example, if a change to the new data model 122 has decreased the robustness of the new data model 122, the administrator 182 can readily reverse the change via the user interface presented on the administrator device 180.

When the robustness score of the new data model 122 is below a first robustness threshold, the administrator 182 may continue to select labeled data sets 118 (i.e., training datasets or ground truth datasets) for execution by the new data model 122 to increase its accuracy. When the robustness score of the new data model 122 meets or exceeds the first robustness threshold, the administrator 182 may configure the new data model 122 to execute on unlabeled content data from one or more content sources 185. As described herein, the first robustness threshold may be a standardized threshold or an arbitrary threshold based on the nature of the new data model 122. In one example, if the labeled datasets 118 are not yielding significant improvement for the new data model 122, the administrator 182 may utilize the trained data models 112 to search for higher quality datasets that may aid in improving the new data model 122.

In some aspects, the administrator 182 may select one or more trained data models 112 having similar or related criteria to the new data model 122. For example, the new data model 122 may have criteria corresponding to the identification and labeling of house cats in content data. The administrator 182 may select a trained data model 112 having criteria corresponding to the identification of animals in image and video content, and execute the trained data model 112 on unlabeled content data from the content data sources 185 or on content streams from the content streaming sources 175. In further implementations, the content yielded from executing the first trained model 112 may then be used to execute a second trained model 112 (e.g., a model having criteria for identifying common pets) to filter the yielded content further, such that the resultant dataset comprises only images having common household pets. As such, the trained data model 112 may serve as a content filter that can comprise a union of multiple trained data models 112 to identify combinations of content data that are most effective for training the new data model 122. The administrator 182 may then utilize this filtered content as a new dataset on which to execute the new data model 122.

As another example, the new data model may have criteria corresponding to the identification and labeling of a specific vehicle in content data. The administrator 182 may search through the trained data models 112 in the database 110 for related criteria and select a trained data model 112 having criteria corresponding to the identification of cars in content data. The administrator 182 may execute the trained data model 112 on content data and/or content streams from the content data sources 185 and/or content streaming sources 175, which can result in only content data that includes cars. The administrator 182 then execute the new data model 122 on this filtered dataset to further improve the robustness of the new data model 122 tailored to only identify the specific vehicle.

As described herein, the administrator 182 and dataset management system 120 can continue refining the new data model 122 using labeled datasets 118 and filtered content using relevant trained data models 112 until the new data model 122 meets or exceeds the first robustness threshold. At this stage, the new data model 122 can enter an evaluation phase using unlabeled content data (e.g., from publicly available content data sources 185 over the Internet). These evaluation datasets can test the robustness of the new data model 122 using random, unlabeled images, video, audio, etc. from the content data sources 185.

The dataset management system 120 can output a robustness score for the new data model 122 after each iteration of execution on the content data. As described herein, the administrator 182 can continue to refine the new data model 122 using a combination of unlabeled content data from content data sources 185, content streams from the content streaming sources 175, the labeled datasets 118 in the database 110, and/or filter content data through use of trained data models 112. As an example, the administrator 182 can continue to provide indications of false positive and/or false negative results to the new data model 122. In some examples, the new data model 122 can output a confidence score for each item of content data (e.g., video frames and/or images) in which the new data model 122 has or has not identified, labeled, and/or classified particular objects, symbols, behaviors, actions, or themes in accordance with its criteria.

In various implementations, the user interface presented on the administrator device 180 can include filtering and searching functions that enable the administrator 182 to view content items in which the new data model 122 has performed identification, labeling, or classifying operations with low confidence. The administrator 182 may then indicate any false positives and/or false negatives to the new data model 122 to continue its training until the robustness score of the new data model 122 meets or exceeds a second robustness threshold. The second robustness threshold can correspond to an accuracy that is nearing 100%, and can indicate that the new data model 122 is robust enough for real world execution. Accordingly, the new data model 122 can be stored with the trained models 112 in the database 110 for on-demand execution on content data or to filter content data for the training of other new data models 122.

According to examples provided herein, the computing system 100 can include a live content processing engine 150 that executes trained data models 112 on live content streams from the content streaming sources 175. As described herein, the content data streams can comprise video streams, group chats or meetings, live television, live radio and other audio streams, podcasts, and the like. In various implementations, the live content processing engine 150 can execute a multi-headed model comprising a plurality of trained data models 112 based on the requisites or internal policies of a content streaming source 175, such as a video chat platform or video streaming service.

For example, a content moderation policy of a video streaming platform may require that no NSFW content—such as nudity, sexual activity, drug use, drug paraphernalia, offensive language, weaponry, and/or violent acts—be presented to viewers. The live content processing engine 150 can execute a multi-headed content moderation model comprising a set of trained models 112 on each video stream of the video streaming platform, which can have criteria for identifying and labelling each of these NSFW characteristics in each video stream in real time. Based on the policy of the video streaming source 175, the live content processing engine 150 can perform any number of actions for a video stream in which an NSFW characteristic is detected. In one example, the live content processing engine 150 can notify the content streaming source 175 for each instance of NSFW detection. Additionally or alternatively, the live content processing engine 150 can automatically transmit a command to shut down the video stream when an NSFW characteristic is detected. Accordingly, the live content processing engine 150 can serve as a third-party content moderation service for the video streaming platform 175, which can enable any number of simultaneous, live video streams at any given time. In additional examples, the live content processing engine 150 can generate a labeled content file of each video stream, which can include metadata indicating timestamps of each detected instance of NSFW content, a label or description of the detected NSFW content, and/or a confidence score for each detected instance, and transmit the labeled content file of each videos stream to the content streaming source 175.

As another example, an audio streaming source 175, such as a podcast platform or live radio channel, may have a policy that no offensive language be used, which can include prohibited words as well as prohibited themes (e.g., prejudiced speech, hate speech, advocacy of violence or harassment, etc.). The live content processing engine 150 can execute a set of trained models 112 having criteria corresponding to these prohibited characteristics in real-time on each audio stream of the audio streaming source 175 to identify and label each instance of prohibited audio on the audio streaming source 175. As described above, the actions performed by the live content processing engine 150 may vary based on the policy of the audio streaming source 175, and can include transmitting a command to automatically shut down an audio stream, logging each instance of detect prohibited audio (e.g., with a descriptor and timestamp) in a labeled content file, transmitting a message to the audio streaming source 175 to notify a computing system or administrator of the audio streaming source 175, and the like.

In another example, a video chat or meeting service may have a policy that prevents underage users from interacting with adult users. The live content processing engine 150 can execute one or more trained data models 112 that perform pixel analysis on the facial features and other characteristics of users on the video chat service to determine an age estimate, a gender, and/or demographic information of the users in each video chat. The one or more trained data models 112 may have been trained with a large number of images and record video in which the faces of individuals are identified and the ages, gender, and/or demographic information of each person is known.

In further examples, the live content processing engine 150 can execute one or more trained models 112 having criteria to process text to identify or generate a probability score for prohibited words, word combinations, phrases, and the like. In some implementations, the one or more trained models 112 can automatically perform optical character recognition (OCR) on images or other content, and then perform text processing to identify any prohibited words, language, phrases, and the like.

When the requisite robustness of each of the one or more trained models 112 is met, the one or more trained data models 112 may be executed on each video chat of the video chat service to determine the ages and/or genders of the user of each video chat. In one example, when the one or more trained data models 112 determine that an adult is interacting with an underage person, the live content processing engine 150 can perform one or more actions, such as notifying the video chat service or transmitting a command to shut down the chat. It is contemplated that the one or more trained data models 112 can further be executed in concert with the content moderation model described herein to perform further controls on the video chat service. It is further contemplated that the live content processing engine 150 can receive additional information that provides context for each chat, such as information indicating whether the users are family members or associated in another manner.

In various examples described herein, the live content processing engine 150 can proactively execute one or more of the trained data models 112 across any number of content streaming sources 175 to generate labeled content files for each content stream based on the criteria of each executing data model 112. In certain implementations, the live content processing engine 150 can include controls to alter the content streams based on detecting specified objects, symbols, behaviors, actions, or themes in a content stream. As described above, one such action is to transmit a command to shut down the content stream. Additional actions are also contemplated, such as generating one or more overlapping layers that augment the content stream with labels of detected objects, augmented pixels (e.g., removal of pixels or blurring selected pixels), augmented audio (e.g., removing audio segments or "bleeping" audio segments), and the like.

It is further contemplated that such actions may be performed in real time, or automatically by the trained models 112 in generating a labeled content file for a content stream. In certain implementations, the live content processing engine 150 can execute one or more trained data models 150 on a content stream that includes advertisements, and can dynamically select one or more labeled advertisements 114 from the database 110 based on the live processing of the content stream. The labeled advertisements 114 can be associated with a particular product, product type, activity (e.g., driving, running, walking, camping, playing music, watching certain types of television programs, exercising, riding a bicycle, playing sports, traveling, etc.), or service. For example, each labeled advertisement 114 stored in the database 110 can be labeled with a set of classifiers (e.g., standardized IAB categories) that enable the live content processing engine 150 to perform matching operations between the classifiers of the advertisements 114 and detected objects, activities, or themes of the content streams.

In certain implementations, the live content processing engine 150 can execute a number of trained data models 112 to determine the current theme of the content stream. The content stream may include advertisement segments in the stream itself, and/or may include advertisement panels surrounding a content stream interface (e.g., a video interface). Based on the current theme or determined category of the content stream (e.g., a determined IAB category based on the labeling performed by the trained data models 112), the live content processing engine 150 can dynamically select one or more labeled advertisements 114 to present within the advertisement segments or advertisement panels of the content stream. A contemplated advantage of this feature is that the advertisements may be selected without knowledge of the viewer's personal information. Rather, the live content processing engine 150 can infer the viewer's interests based on the presented content of the content stream.

For example, a content stream can present video and audio information corresponding to the history of a particular country, such as Greece. One or more trained data models 112 can detect elements in the content stream indicative of the subject matter and country, and the live content processing engine 150 can parse through the labeled advertisements 114 in the database 110 to identify one or more advertisements that correspond to Greek history, travel to Greece, Greek museum and/or point of interest tours, hotels in Greece, flights to Greece, Greek restaurants, and the like. In some examples, the live content processing engine 150 can rank such advertisements according to relevance based on the content processing by the trained data model(s) 112, and select the highest ranked advertisements for presentation within or in conjunction with the content stream.

As another example, a content stream may be associated with a particular activity, such as camping, and labels outputted by the trained data models 112 based on pixel analysis may identify camping equipment in the content stream, such as one or more tents. The live content processing engine 150 can utilize the labels outputted by the trained data models 112 to select a number of labeled advertisements 114 that correspond to tent products or related camping equipment for dynamic presentation within or in conjunction with the content stream.

The advertisement selection process performed by the live content processing engine 150 may be highly granular and may be performed in real-time. That is, as the content stream is being processed by the one or more trained data models 112, the live content processing engine 150 can dynamically compare the labeled information outputted by the trained data models 112 with the classifications of the labeled advertisements 114 in real-time. Accordingly, as the themes of the content streams change, the labels outputted by the trained data models 112 correspondingly change as well, and the live data processing engine 150 selects corresponding advertisements for presentation within or in conjunction with the content streams accordingly.

It is contemplated that the live content processing engine 150 can perform such advertisement selection functions across all content streams of a content streaming source 175, and across multiple content streaming sources 175. It is further contemplated that the live content processing engine 150 can match the selected advertisements with the content medium, such that relevant video advertisements are dynamically selected for video streams, relevant audio advertisements are dynamically selected for audio streams, and relevant image advertisements are dynamically selected for presentation on dedicated advertisement panels (e.g., HTML5 panels) adjacent to content streams—all based on the outputted labels of the trained data models 112.

In further examples, the live content processing engine 150 can execute trained models 112 that detect monetization triggers in content streams that may require monetary compensation to a video streaming host or to the content streaming source 175 (e.g., for presenting copyrighted material, sponsorship plugs, etc.). For example, the live content processing engine 150 may detect the use of a copyrighted song in a video stream, which can trigger the live content processing engine 150 to transmit a monetization request to a valuation engine 140 of the computing system 100. In another example, the live content processing engine 150 may detect a video streaming host presenting and describing a consumer product or a sponsor of the video stream, which can trigger a monetization request to the valuation engine 140.

In various examples, the valuation engine 140 can process historical valuation data of previous content streams and calculate valuations to determine a value estimate for each monetization trigger. For example, when a musician's song or a copyrighted video clip is played in a streaming video without prior permission, the valuation engine 140 can determine previous instances of the song or video clip being presented on previous content streams, and determine one or more amounts that correspond to a monetary value for the presented content. Based on the historical data, the valuation engine 140 can generate a value estimate for each monetary trigger, which can be based on previously determined amounts paid for the content or portions of the content, an amount of time that the content is presented, a prominence of the content (e.g., whether a song is played as an introduction to a video or whether it is played in the background), and a popularity of the content. The value estimate may then be transmitted to the content streaming source 175 or directly to a user device 190 of a presenter of the content.

According to examples described herein, the computing system 100 can include a logo detection engine 130 that executes a logo detection model 132 on content streams that may be live or recorded or content data from the content data sources 185. The logo detection model 132 can comprise one or more data models 112 that have been trained in accordance with the processes described throughout the present disclosure. The logo detection model 132 can process content data or content streams to detect any type of logo owned by any number of brand owners and for each instance of detection, the logo detection model 132 can generate a prominence score for the detected logo.

Specifically, during a training phase, the logo detection model 132 can be provided with a logo corpus 116 comprising an abundance of image examples of each logo on different types of logo mediums, such as advertising billboards, clothing, automobiles, screens, building walls, etc. The logo detection model 132 can go through the training process with several iterations of content processing, false negative and false positive training, and refinement until the logo detection model 132 achieves an accuracy of nearly 100% for any logo in the corpus 116 that is present in any content medium (e.g., spoken brands in audio content, logos presented on streaming television, logos presented in different languages, etc.). Once trained and evaluated, the logo detection model 132 can be executed by the logo detection engine 130 on any content data (e.g., images, videos, and audio) to compare pixel combinations with any number of logos of a logo corpus 116 stored in the database 110. In doing so, the logo detection engine 130 can further perform digital image de-warping techniques or angular resolution techniques to identify logos that may be warped or distorted in the content data (e.g., logos on clothing and/or logos presented at an angle on a display screen).

In various implementations, the logo detection engine 130 can execute the logo detection model 132 on specified content for purposes of sponsorship valuation or on-air valuation for a brand owner. The sponsorship or on-air valuation can be performed as a valuation assessment subsequent to a sponsorship agreement in which a sponsor (e.g., a brand owner) agrees to pay a certain sponsorship amount to a publicized entity (e.g., a sports team) to have its logos associated with the publicized entity during content broadcasts. For example, a company may wish to spend advertising money to place its logo(s) on a racing automobile racing for a racing season. An agreed upon sponsorship amount between the company and a racing organization that operates the racing automobile can be transferred to the racing organization in exchange for placement of company's logos on the racing car during broadcasted races over the racing season.

In the example provided, the company may wish to know whether an advertising value corresponding to the on-air presentation of its logo on the racing automobile during broadcasted races is commensurate with the sponsorship amount paid to the racing organization. According to examples described herein, the logo detection engine 130 can execute the logo detection model 132 on broadcasts of each race of the racing season and identify the company's logo(s) on the racing automobile during the broadcasts and generate a prominence score for each instance of detection. As provided herein, the prominence score can correspond to a clarity of the logo (e.g., whether the logo is blurred or clearly presented), a size of the logo in relation of a size of a display screen, and an amount of time the logo is presented for each detected instance. Accordingly, a low prominence score can correspond to the detected logo having relatively low clarity, small size, and/or being only briefly presented in the broadcast, and a high prominence score can correspond to the detected logo having relatively high clarity, large size, and/or being presented for a longer amount of time in the broadcast. As further provided herein, the prominence score can also be based on logo dilution, which can correspond to whether the logo is the sole logo in the content data, or whether the logo is one or a plurality of logos in the content data. In the latter case, the prominence score may be further based on relative size, clarity, and temporal prominence of the logo as compared to the other logo(s) in the content data.

For each race over the course of the racing season, the logo detection engine 130 can transmit the prominence scores (e.g., including broadcast timestamps for each detected instance of the logo) to the valuation engine 140 of the computing system 100. The valuation engine 140 can obtain additional data corresponding to the broadcast, such as viewership over the course of the broadcast (e.g., viewership numbers for each minute or second of the broadcast), and can utilize historical valuation data of previous sponsorship amounts and corresponding on-air display to determine an overall value estimate of the presentation of the company's logo(s) on the racing automobile for each race or for the entirety of the racing season. The valuation engine 140 may then transmit the value estimate to the company for its own internal valuation analytics.

In further examples, the logo detection engine 130 and valuation engine 140 can provide value estimates for prospective sponsors that have not yet agreed to a sponsorship agreement. In such examples, the logo detection model 132 can execute on previously recorded content (e.g., sports broadcasts of a particular sporting organization over the course of a previous sporting season) and augment certain elements (e.g., portions of sports clothing of members of the sporting organization or a portion of a racing vehicle on which the logo(s) are to be placed) in the content to include the prospective sponsor's logo(s). The valuation engine 140 can obtain data indicating viewership that corresponds to the previously recorded content and utilize historical sponsorship valuation data to generate a value estimate of a potential sponsorship agreement for the prospective sponsor.

The historical sponsorship valuation data can comprise any number of previous sponsorship agreements, each being associated with a sponsorship amount (e.g., an overall monetary amount paid to a publicized entity), visibility scores that correspond to the prominence of the sponsor's logo(s) during broadcasts and/or public events, and the viewership of the broadcasts that display the sponsor's logo(s). The valuation engine 140 can utilize these historical valuation data to determine a valuation formula 142 that factors in the visibility scores and viewership information to output one or more value estimates for a prospective sponsorship agreement. As provided herein, the valuation formula 142 can associate viewership numbers and the prominence of a sponsor's logos when displayed in broadcasts on a granular level. For example, each instance that a sponsor's logo is displayed on a broadcast with a particular prominence score can be associated with a viewership number for that instance. Accordingly, when determining an overall value estimate for a sponsorship (e.g., over an entire sporting season), the valuation engine 140 can calculate individual valuations for each instance that a sponsor's logo is displayed on a broadcast, and tally the individual valuations to determine the overall value estimate.

Thus, the logo detection engine 130 and valuation engine 140 can be utilized by current sponsors to determine whether the on-air value of their logos substantially matches the values of their sponsorship agreements, or by prospective sponsors to determine a reasonable sponsorship value amount to attribute to a prospective sponsorship agreement. In the latter example, the logo detection engine 130 can augment polygons or bounding boxes in recorded content— corresponding to the locations in the recorded content that the prospective sponsor's logo(s) would be placed, which can include locations on sports clothing, walls or billboards (e.g., at sporting events), vehicles (e.g., racing vehicles), and the like—and the valuation engine 140 can utilize the valuation formula 142 to determine a value estimate of a similar or replacement sponsorship for the prospective sponsor. the value estimate may then be transmitted to a computing device 190 of a user 197 that is associated with the prospective sponsorship agreement.

In further examples, the logo detection engine 130 can perform additional functions on live or recorded content, such as automatic blurring of detected logos, pixel replacement of logos (e.g., with other logos), or augmenting the content to remove logos. In certain implementations, the logo detection engine 130 can execute the logo detection model 132 on a content stream to perform pixel analysis on the content stream (e.g., recorded or live content stream) and identify and/or label each detected logo in the content stream. In some aspects, the logo detection model 132 can generate a polygon or bounding box that precisely encompasses each logo. The logo detection engine 130 may then augment the contents of each polygon or bounding box that encompasses a logo accordingly. As described herein, the augmentation can correspond to one or more of (i) background pixel color matching (e.g., to simply remove the logo without creating a "hole" in the presented content stream), (ii) automatic blurring of logos, or (iii) replacement of the logos with alternative content (e.g., selected symbols, images, or other logos).

The logo detection engine 130 may generate an augmented content file comprising the augmented content stream, and transmit the augmented content file to the content streaming source 175 or a computing device 190 of a user 197 (e.g., a requester of the augmented content stream for subsequent broadcast). As provided herein, a user 197 can comprise a client of the various services implemented by the computing system 100, such as a client that wishes to train a new data model 122, a client that requests a labeled or augmented content file, a client obtaining valuation estimates of a sponsorship or the use of owned material (e.g., copyrighted music or video clips), or a client seeking to monetize created content.

Methodology

In the below descriptions of the flow charts shown in FIGS. 2, 3, and 4, reference may be made to reference characters representing like features as shown and described with respect to FIG. 1. Furthermore, the processes described in connection with FIGS. 2, 3, and 4 may be performed by one or more logical blocks of the computing system 100 as shown and described with respect to FIG. 1. Still further, the processes described with respect to FIGS. 2, 3, and 4 need not be performed in the order shown in the figures, and each step of the flow charts may be performed prior to, in conjunction with, or subsequent to any other step shown in FIGS. 2, 3, and 4.

Figure 2:
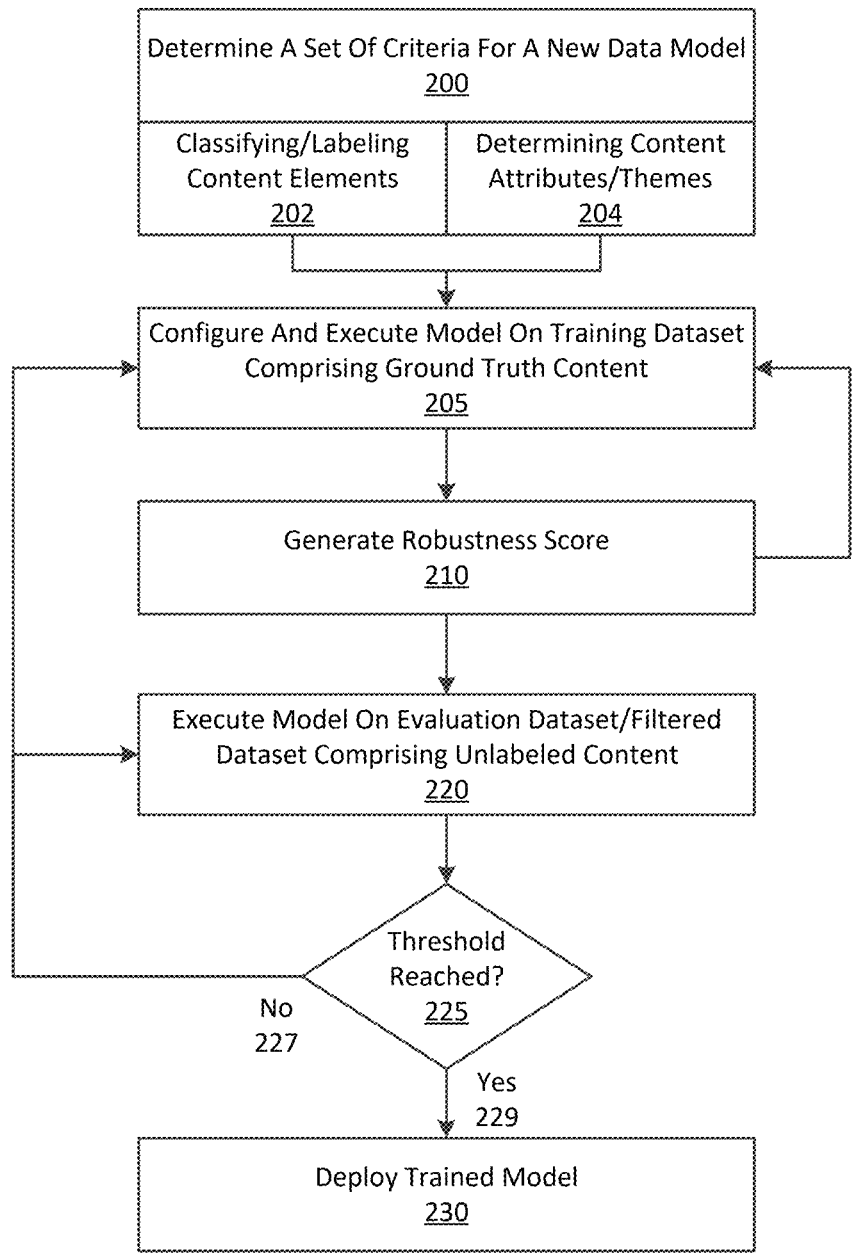
FIG. 2 is a flow chart describing an example method of executing a dataset management system for training data models, according to examples described herein.

FIG. 2 is a flow chart describing an example method of executing a dataset management system for training data models, according to examples described herein. The process described with respect to FIG. 2 may be performed by the computing system 100 via communication with one or more administrator devices 180 being operated by one or more administrators 182 interacting with a customized user interface for training new data models 122. Referring to FIG. 2, the computing system 100 can determine a set of criteria for a new data model 122 (200). As described herein, the set of criteria can correspond to classifying or labeling certain elements in content data (e.g., logos, faces, objects, symbols, etc.) (202), or performing higher order functions, such as determining content attributes and/or themes (e.g., the age of users, NSFW content, IAB categories in the content, etc.) (204).

In various implementations, the computing system 100 can configure and execute the new data model 122 on a training dataset 118 that comprises ground truth content that has been previously labeled (205). Subsequent to executing the new data model 122 on the training dataset 118, the computing system 100 can output a robustness score that indicates the accuracy of the new data model 122 (210). In various examples, the new data model 122 may be submitted for human labeling to be configured or refined (e.g., indicating false positives and false negatives). Thereafter, the system 100 can continue to execute the new data model 122 on training datasets 118, repeating the process for any number of iterations (205).

The new data model 122 meets or exceeds the first robustness threshold (219), then the system 100 can execute the new data model on an evaluation dataset and/or filtered dataset comprising unlabeled content data (220). As described above, the evaluation dataset may be publicly available content (e.g., found on the Internet), and/or may be randomized content or targeted content discovered through execution of a related, trained data model 112. As further described above, the filtered dataset may be obtained by executing one or more trained data models 112 (e.g., having similar criteria to the new data model 122) on publicly available content. Subsequent to executing the new data model 122 on the evaluation dataset, the system 100 can generate a robustness score and determine whether the robustness score meets or exceeds a robustness threshold (225).

The robustness threshold can correspond to an exceptionally high accuracy (e.g., human-level accuracy or above), such that the new data model 122 is nearly fully trained and can execute on unlabeled data with nearly 100% accuracy (e.g., no clear false positives or false negatives). If the new data model 122 has not met or exceeded the robustness threshold (227), then the system 100 and/or administrator 182 can continue the training, evaluation, and/or refinement process to continue improving the robustness of the new data model 122. However, when the new data model 122 does meet or exceed the robustness threshold (229), the new data model 122 may be deployed as a trained data model 112 (230) (e.g., for on-demand client or internal utilization).

Figure 3:
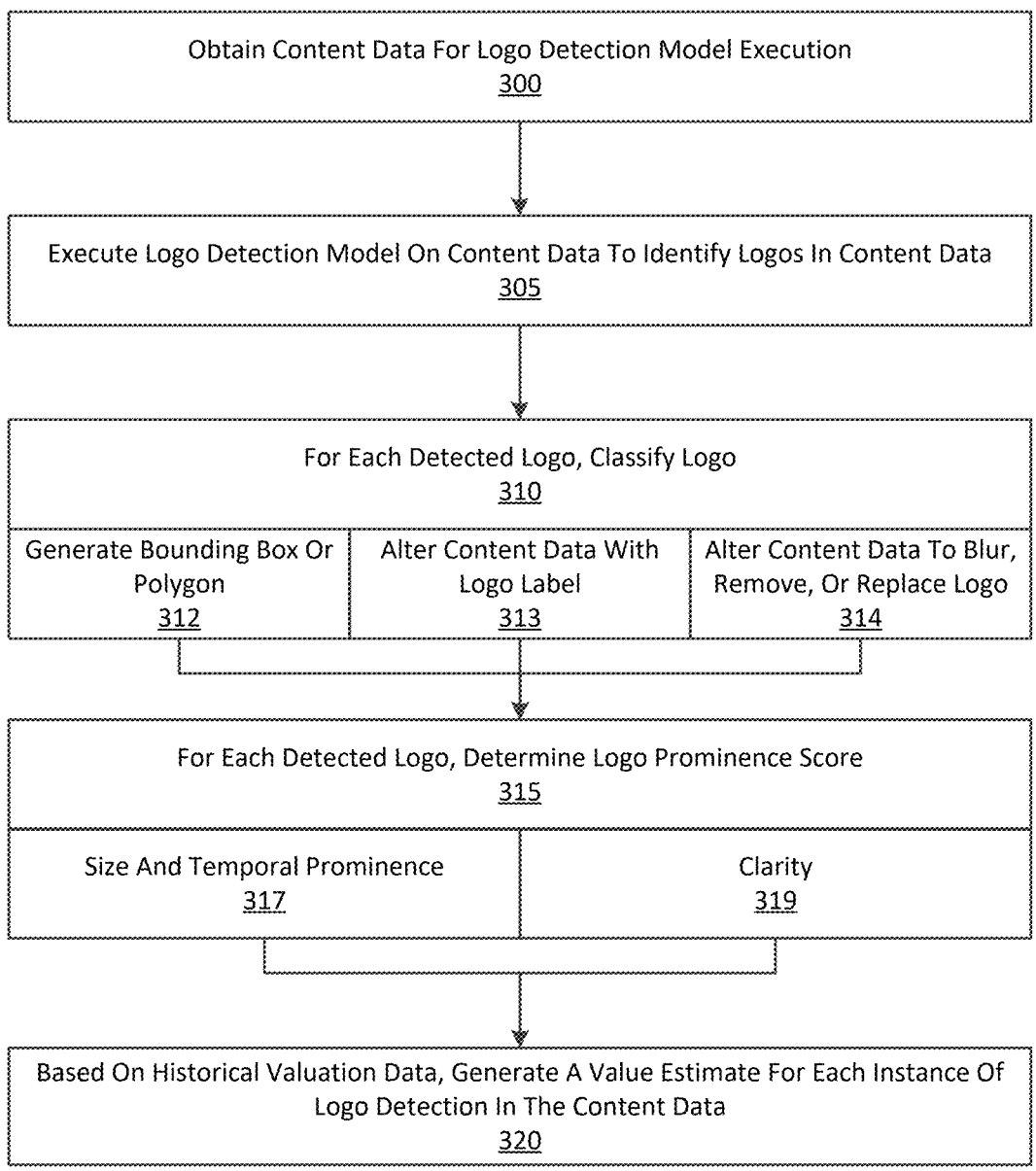
FIG. 3 is a flow chart describing an example method of executing a logo detection model, according to examples described herein.

FIG. 3 is a flow chart describing an example method of executing a logo detection model 132, according to examples described herein. Referring to FIG. 3, the computing system 100 can obtain content data (e.g., unlabeled images, audio, and/or video content) for logo detection model execution 132 (300). As provided herein, the content data can comprise recorded content, or can comprise a live content stream in which the logo detection model 132 executes and performs the described functions in real-time. In various examples, the logo detection model 132 can execute on the content data to identify any number of logos in the content data (305). Execution of the logo detection model 132 on the content data can result in the model 132 classifying each detected logo (310). For example, the logo detection model 132 can perform pixel processing on the content data to identify edges that collectively make up a logo from the logo corpus 116 in the database 110. Each logo in the corpus 116 can be associated with a label or name of a brand owner, product, or service, and the logo detection model 132 can input the label or name in the content data (e.g., in metadata).

As described herein, the logo detection model 132 can perform additional functions for each detected logo. For example, execution of the logo detection model can cause the system 100 to generate a bounding box or polygon that encompasses the logo (312), alter the content data to include the label for the logo (e.g., naming a brand owner of the logo) (313), and/or alter the content data to blur, remove, or replace the logo (314). In various implementations, the logo detection model 132 can also determine a prominence score for each instance of logo detection (315). As described above, the prominence score of a detected logo can correspond to the size and temporal prominence of the logo (317), and can further correspond to a clarity of the logo on the display screen (319). In some examples, the prominence score can also be based on logo dilution, which can correspond to whether the logo is the sole logo in the content data, or whether the logo is one or a plurality of logos in the content data. In the latter case, the prominence score may be further based on relative size, clarity, and temporal prominence of the logo as compared to the other logo(s) in the content data.

Based on the prominence score of each detected logo, and based on historical valuation data, the computing system 100 can generate a value estimate for each instance of logo detection in the content data, or cumulatively for an entirety of the content data (320). As provided herein, the computing system 100 can attribute a value estimate for each logo detected in the content data for a variety of purposes. One such purpose is advertising value analytics for advertisers representing brand owners that have ownership of a particular logo. Accordingly, the value estimate generated by the computing system 100 for a logo in a particular broadcast may be used by the advertisers for pricing advertisements on various content mediums. Another purpose is sponsorship analytics for prospective sponsors that may wish to determine an on-air value of their logo(s) if the logo were to be present on or associated with a publicity entity (e.g., sewn into a sporting team's jerseys or presented on a quarter-panel of a racing vehicle).

Figure 4:
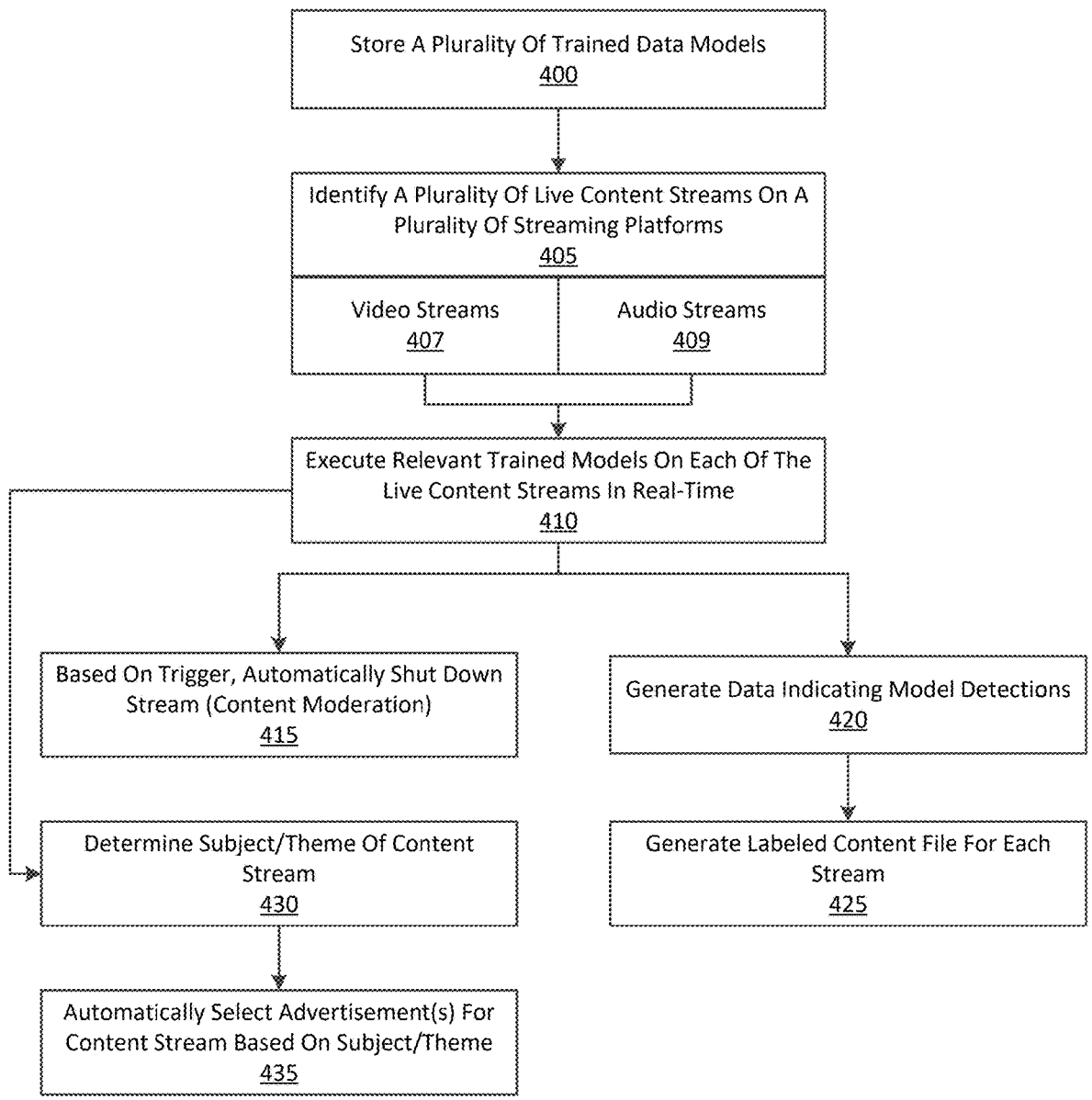
FIG. 4 is a flow chart describing an example method of proactive data model execution on real-time content, according to examples described herein.

FIG. 4 is a flow chart describing an example method of proactive data model execution on real-time content, according to examples described herein. Referring to FIG. 4, the computing system 100 can store a plurality of trained data models 112 in a database 110 (400). The system 100 can determine a plurality of live content streams one a plurality of streaming platforms (405). As described herein, the content streams can comprise video streams (407) and audio stream (409), and the streaming platforms can include video sharing, social media, video chat or video meeting, podcast, audio chat, streaming television, streaming radio, or any other platform that enables live streaming.

In various implementations, the computing system 100 can execute a set of relevant, trained data models 112 on each of the live content streams in real-time (410). In certain examples, the computing system 100 can execute a set of trained data models 112 that perform the content moderation techniques described herein. For example, live video streams on a video streaming platform may be required to adhere to a policy in which certain behavior or content is prohibited, such as nudity, offensive language, violence, lewd behavior, etc. The computing system 100 can execute a set of trained data models 112 tuned to detect each category of prohibited content on each video stream of the video streaming platform. As another example, the computing system 100 can execute an audio processing data model 112 on podcasts or live radio streams to detect prohibited language or prohibited types of speech (e.g., incitement of violence or hate speech).

In further examples, a video chat service may have a policy that prohibits minors from interacting with adults. In addition to the content moderation models 112, the computing system 100 may also execute one or more age processing models 112 that process facial characteristics of chat users 197 and/or other background elements in the chat to determine an age of each user 197. Such background elements can comprise any features that may be determinative or provide an indication of the user's age, and can include indicators of whether the user 197 is in a bedroom versus an office, the characteristics of elements on a background wall of the user 197 (e.g., a library of books versus a poster of a modern musical group), and the like.

Any number of actions can be performed when a trained model 112 detects language, an object, an action, or a behavior that is prohibited by the streaming service's policy. In one example, the computing system 100 can transmit a notification or alert to the user 197 that has violated the policy (e.g., through a user interface of the streaming service), which can indicate that further violations may result in the stream being shut down or the user 197 being suspended or banned from the streaming service. As another example, the computing system 100 can transmit a notification of the violation to a computing system of the streaming service, which can include an identifier of the violating user 197 and contextual information corresponding to the nature of the violation.

In further examples, the computing system 100 can transmit a command to automatically shut down a content stream when one or more policy violation triggers are detected by the trained data models 112 (415). Additionally or alternatively, the computing system 100 can generate data indicating each instance of detection by the trained data models 112 executing on each content stream (420). Based on the model detections, the computing system 100 may generate a labeled content file for each content stream (425). As described herein, the labeled content file can include metadata that includes a timestamp and a contextual description of each detection by a trained data model 112.

In certain implementations, the computing system 100 can execute a set of trained models 112 to determine a subject matter or theme of a content stream (430). In doing so, the trained data models 112 can identify particular sceneries, objects, scene settings, products, and the like, to determine one or more IAB categories for the content stream at any particular time. Simultaneously, the computing system 100 can perform a matching operation between the detected subject matter or theme—and the various objects and elements identified and/or labeled in the content stream—and automatically select one or more highly relevant advertisements from a corpus of labeled advertisements 114 stored in a database 110 (435) for presentation within or in conjunction with the content stream. For example, the selected advertisements 114 may be placed in dedicated advertising breaks in the content stream and/or placed in dedicated advertising panels adjacent to the content stream.

It is contemplated that one or more processes described in connection with FIGS. 2, 3, and 4 may be performed in real-time for live content streams, or may be performed for recorded content. Furthermore, the selection of trained data models 112 for execution on each content stream or content streaming platform may be performed by an administrator 182, a representative of the content streaming platform, or may be performed automatically by the computing system 100 upon determination of a policy or preference of the content streaming platform.

User Computing Device

Figure 5:
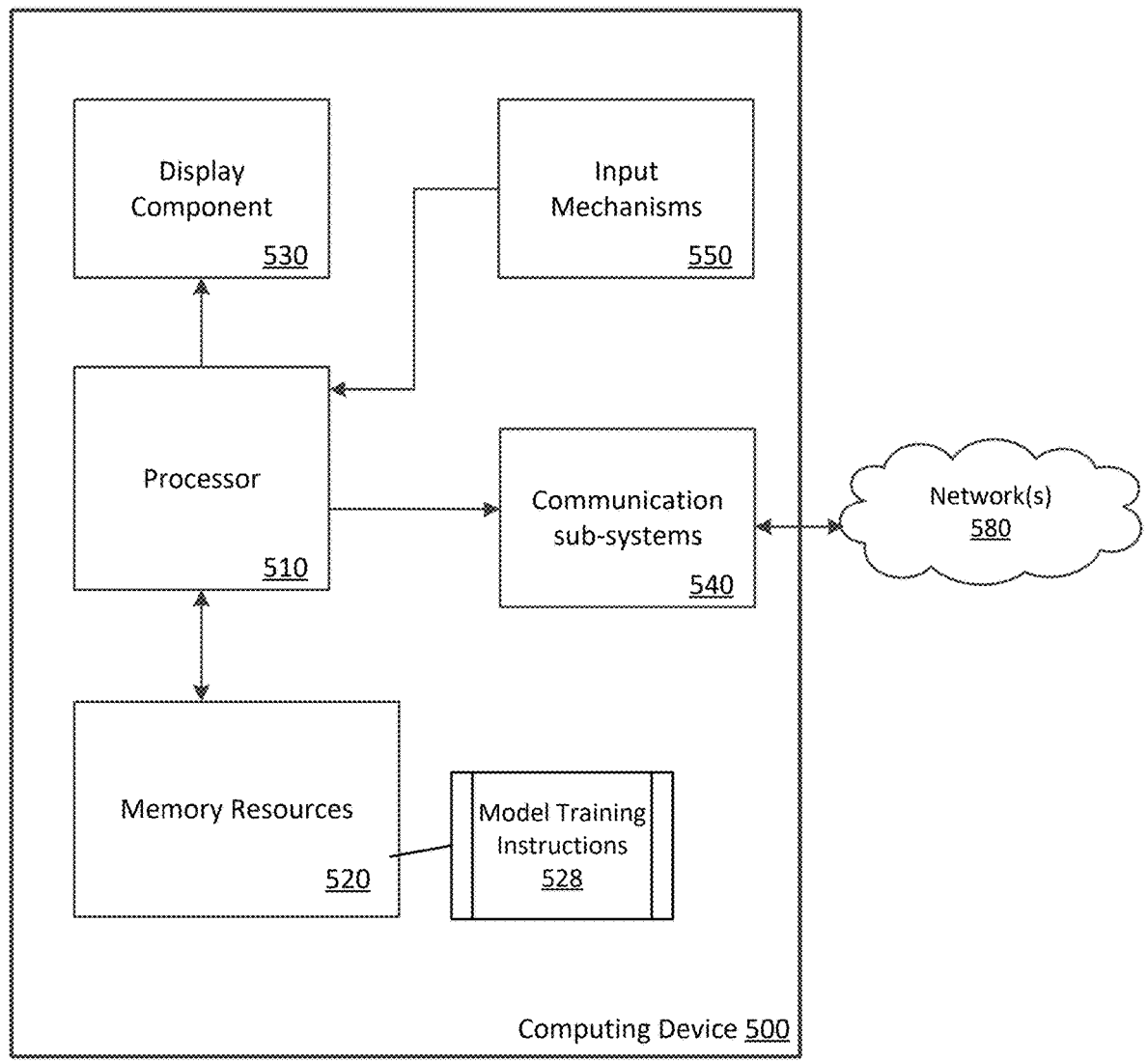
FIG. 5 is a block diagram showing a user computing device, according to examples described herein.

FIG. 5 is a block diagram that illustrates a computing device 500 upon which examples described herein may be implemented. In one embodiment, the computing device 500 may correspond to, for example, a cellular device that is capable of telephony, messaging, and data services. In other examples, the computing device 500 may correspond to an immersive-type computing device, such as an augmented-reality headset or wearable goggle device. In further examples, the computing device 500 may comprise a personal computer, tablet computer, laptop computer, all-in one device, and like computing devices. The computing device 500 can correspond to a device operated by a user for presenting content processed by data models. In further examples, the computing device 500 may be operated by an administrator that can interact with a customized user interface for training data models, viewing robustness scores of new data models (e.g., PR curves), and selecting datasets for model training and evaluation.

The computing device 500 includes a processor 510, memory resources 520, a display component 530 (e.g., such as a touch-sensitive display device and/or LCD or LED display screen), one or more communication sub-systems 540 (including wireless communication systems), one or more input mechanisms 550 (e.g., a keyboard or capacitive touch sensors). In one example, at least one communication sub-system 540 sends and receives data over one or more network(s) 580 (e.g., data channels and/or voice channels). The one or more communication sub-systems 540 can include a cellular transceiver, a short-range wireless transceivers, a Wi-Fi transceiver, Ethernet, or any other suitable communication system for communicating with other computing devices and computing systems over the one or more networks 580. The processor 510 can exchange data with the computing system 100 of FIG. 1 via the one or more communications sub-systems 540 and over the one or more network(s) 570.

The processor 510 can provide a variety of content to display component 530 by executing instructions stored in the memory resources 520. The memory resources 520 can store instructions corresponding to one or more application programs, such as model training instructions 528, a content streaming application, and the like. For example, processor 510 can execute one or more applications or programs to read data from one or more input mechanisms 550 of the computing device, and to transmit data to a computing system (e.g., computing system 100). In the context of the present application, the processor 510 can execute the model training instructions 528 to present a user interface for an administrator to train a new data model in accordance with the examples described throughout the present disclosure.

In examples, processor 510 can retrieve from memory resources 520 instructions for executing one or more applications or programs. As described with examples herein, execution of the applications or programs can enable a user or administrator to engage with the computing system 100 in the manner set forth above, such as training data models, executing data models on datasets, providing refinements to data models, viewing data model robustness, viewing augmented or labeled content produced by the data models, engaging with or viewing a content stream being monitored or otherwise processed by one or more data models, and the like.

Hardware Diagram

Figure 6:
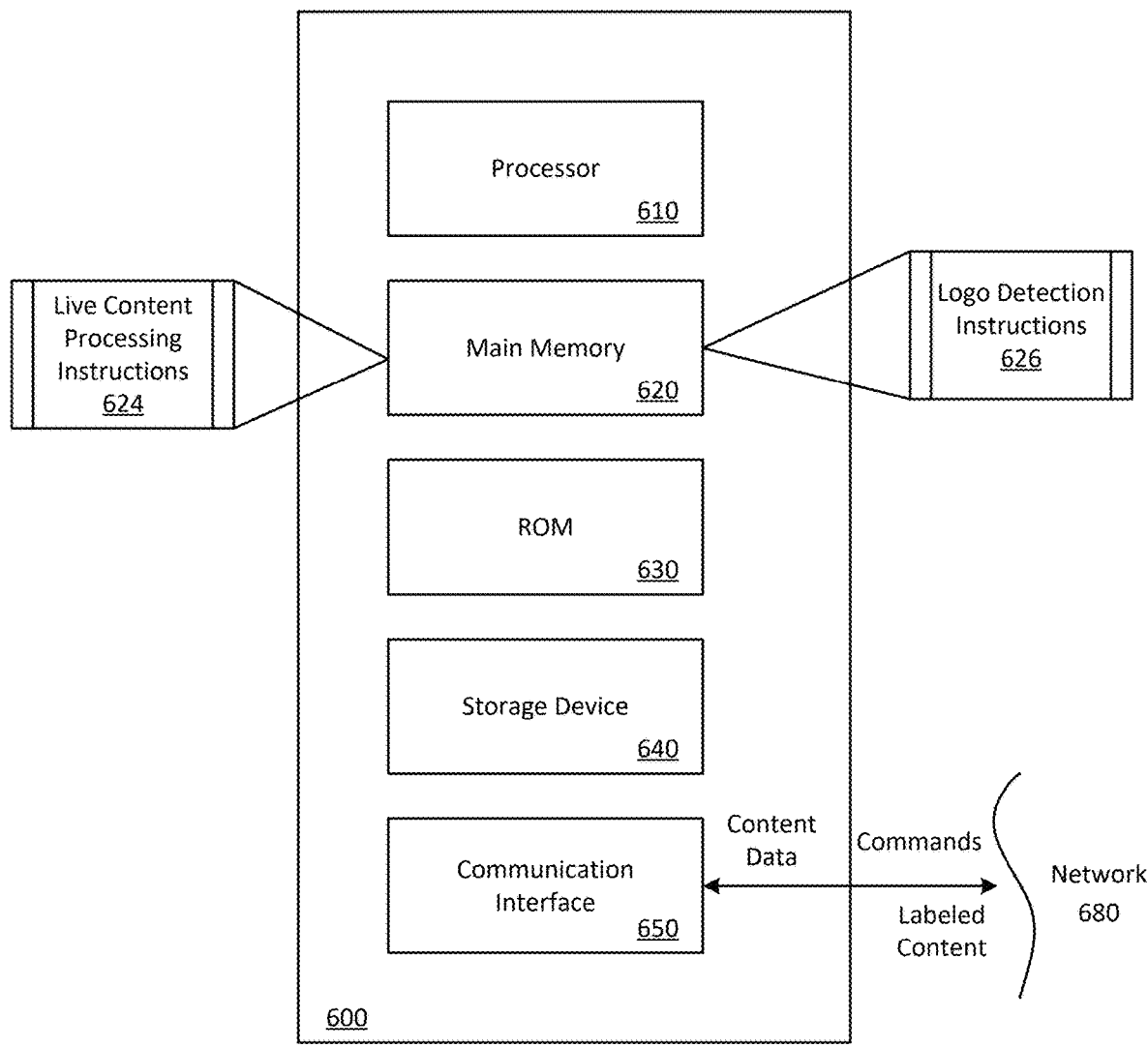
FIG. 6 is a block diagram that illustrates a computer system upon which examples described herein may be implemented.

FIG. 6 illustrates a computer system on which one or more example control systems can be implemented. The computer system 600 can be implemented on, for example, a server or combination of servers. For example, computer system 600 may be implemented as a server for a computing system 100, such as shown and described with an example of FIG. 1. Likewise, computer system 600 can implement a method such as described with examples of FIG. 2, FIG. 3, and/or FIG. 4.

In one implementation, computer system 600 includes one or more processors 610, memory resources 620 (e.g., read-only memory (ROM) 630 or random-access memory (RAM)), a storage device 640, and a communication interface 650. Computer system 600 includes at least one processor 610 for processing information stored in memory resources 620, such as provided by a random-access memory (RAM) or other dynamic storage device, for storing information and instructions which are executable by the one or more processors 610. Memory resources 620 also may be used for storing temporary variables or other intermediate information during execution of instructions to be executed by the one or more processors 610. Computer system 600 may also include memory resources 620 or other static storage device for storing static information and instructions for the one or more processors 610. Storage device 630, such as a magnetic disk or optical disk, is provided for storing information and instructions.

Communication interface 650 enables computer system 600 to communicate with one or more networks (e.g., cellular network) through use of network link 680 (wireless or a wire). Additionally, computer system 600 can utilize network link 680 to communicate with one or more computing devices, specialized devices and modules, and one or more servers. The executable instructions stored in memory resources 620 may implement a method, such as described with one or more examples of FIGS. 2, 3, and/or 4.

As such, examples described herein are related to the use of computer system 600 for implementing the techniques described herein. According to an aspect, techniques are performed by computer system 600 in response to the one or more processors 610 executing one or more sequences of one or more instructions contained in memory resources 620. Such instructions may be read into memory resources 620 from another machine-readable medium, such as storage device 640. Execution of the sequences of instructions contained in memory resources 620 causes the one or more processors 610 to perform the process steps described herein. In alternative implementations, hard-wired circuitry may be used in place of or in combination with software instructions to implement examples described herein. Thus, the examples described are not limited to any specific combination of hardware circuitry and software.

By way of example, the executable instructions stored in the memory 620 of the computer system 600 include logo detection instructions 626 and live content processing instructions 624.

The processor 610 can execute the logo detection instructions 626 to process content data, which can comprise images, text, audio, and/or video content. The logo detection instructions 626 can cause the processor 610 to detect logos or brand names in the content data and perform functions such as labeling the logos, augmenting the content data to generate bounding boxes or polygons that encompass each logo, or augmenting the content data to blur, remove, or replace the logos, as described above.

The processor 610 can further execute the live content processing instructions 624 to execute a set of trained data models on content streams to perform the content moderation, advertisement selection, and content labeling functions described throughout the present disclosure. In doing so, the processor 610 can perform actions such as generating a labeled content file for the content streams, or transmitting notifications to content streaming sources, or transmitting commands to shut down content streams.

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing system comprising:
   a database storing a plurality of data models, each data model being configured to sort datasets based on a set of criteria unique to the data model;
   one or more processors; and
   a memory resource storing instructions that, when executed by the one or more processors, cause the computing system to:
   receive a content policy from a content streaming platform on which a plurality of live content streams are provided simultaneously to a plurality of users, the content policy identifying a plurality of moderated content characteristics;
   implement, in real-time, a content moderation service for the content streaming platform that is based on the content policy, by:

processing the plurality of live content streams of the content streaming platform;

for each live content stream of the plurality of live content streams, (i) executing a multi-headed model that utilizes the plurality of data models to identify each content characteristic of the plurality of moderated content characteristics that is present in the live content stream; and (ii) generating a labeled content file that indicates each identified content characteristic of the plurality of moderated content characteristics; and for at least a first live content stream of the plurality of live content streams, automatically performing an action, without user input, in response to detecting that the first live content stream of the plurality of live content streams includes one or more of the plurality of moderated content characteristics;

wherein the automatically performed action comprises transmitting the labeled content file to a computing device of the content streaming platform.

2. The computing system of claim 1, wherein the set of criteria unique to each data model corresponds to at least one of classifying or labeling elements in content data of each of the plurality of live content streams.

3. The computing system of claim 1, wherein the automatically performed action further comprises at least one of transmitting a notification to a computing device of the content streaming platform or transmitting a command to shut down the first live content stream.

4. The computing system of claim 1, wherein the first live content stream of the plurality of live content streams includes advertisements, and wherein the executed instructions further cause the computing system to:

determine, based on executing each data model of the plurality of data models on the first live content stream, a current advertising category for the first live content stream; and select, for presentation on the first live content stream, one or more advertisements from a plurality of labeled advertisements in a database that match the current advertising category of the first live content stream.

5. The computing system of claim 4, wherein the first live content stream includes one or more advertising breaks in the first live content stream, and wherein the executed instructions cause the computing system to select the one or more advertisements in real-time for an upcoming advertisement break in the first live content stream.

6. A non-transitory computer readable medium storing instructions that, when executed by one or more processors of a computing system, cause the computing system to:

store, in a database, a plurality of data models, each data model being configured to sort datasets based on a set of criteria unique to the data model;

receive a content policy from a content streaming platform on which a plurality of live content streams are provided simultaneously to a plurality of users, the content policy identifying a plurality of moderated content characteristics;

implement, in real-time, a content moderation service for the content streaming platform that is based on the content policy, by:

processing the plurality of live content streams of the content streaming platform;

for each live content stream of the plurality of live content streams, (i) executing a multi-headed model that utilizes the plurality of data models to identify each content characteristic of the plurality of moderated content characteristics that is present in the live content stream; and (ii) generating a labeled content file that indicates each identified content characteristic of the plurality of moderated content characteristics; and for at least a first live content stream of the plurality of live content streams, automatically performing an action, without user input, in response to detecting that the first live content stream of the plurality of live content streams includes one or more of the plurality of moderated content characteristics;

wherein the automatically performed action comprises transmitting the labeled content file to a computing device of the content streaming platform.

7. The non-transitory computer readable medium of claim 6, wherein the set of criteria unique to each data model corresponds to at least one of classifying or labeling elements in content data of each of the plurality of live content streams.

8. The non-transitory computer readable medium of claim 6, wherein the automatically performed action comprises at least one of transmitting a notification to a computing device of the content streaming platform or transmitting a command to shut down the first live content stream.

9. The non-transitory computer readable medium of claim 6, wherein the first live content stream of the plurality of live content streams includes advertisements, and wherein the executed instructions further cause the computing system to:

determine, based on executing each data model of the plurality of data models on the first live content stream, a current advertising category for the first live content stream; and select, for presentation on the first live content stream, one or more advertisements from a plurality of labeled advertisements in a database that match the current advertising category of the first live content stream.

10. The non-transitory computer readable medium of claim 9, wherein the first live content stream includes one or more advertising breaks in the first live content stream, and wherein the executed instructions cause the computing system to select the one or more advertisements in real-time for an upcoming advertisement break in the first live content stream.

11. A computer-implemented method of real-time content data processing, the method being performed by one or more processors and comprising:

storing, in a database, a plurality of data models, each data model being configured to sort datasets based on a set of criteria unique to the data model;

receiving a content policy from a content streaming platform on which a plurality of live content streams are provided simultaneously to a plurality of users, the content policy identifying a plurality of moderated content characteristics;

implementing, in real-time, a content moderation service for the content streaming platform that is based on the content policy, by:

processing the plurality of live content streams of the content streaming platform;

for each live content stream of the plurality of live content streams, (i) executing a multi-headed model that utilizes the plurality of data models to identify each content characteristic of the plurality of moderated content characteristics that is present in the live content stream; and (ii) generating a labeled content file describing each live content stream of the plurality of live content streams; and for at least a first live content stream of the plurality of live content streams, automatically performing an action, without user input, in response to detecting that the first live content stream of the plurality of live content streams includes one or more of the plurality of moderated content characteristics;

wherein the automatically performed action comprises transmitting the labeled content file to a computing device of the content streaming platform.

12. The method of claim 11, wherein the set of criteria unique to each data model corresponds to at least one of classifying or labeling elements in content data of each of the plurality of live content streams.

13. The method of claim 11, wherein the automatically performed action comprises at least one of transmitting a notification to a computing device of the content streaming platform or transmitting a command to shut down the first live content stream.

14. The method of claim 11, wherein the first live content stream of the plurality of live content streams includes advertisements, the method further comprising:

determining, based on executing each data model of the plurality of data models on the first live content stream, a current advertising category for the first live content stream; and selecting, for presentation on the first live content stream, one or more advertisements from a plurality of labeled advertisements in a database that match the current advertising category of the first live content stream.

15. The computing system of claim 1, wherein the content policy specifies a set of moderation categories identified by a content moderation model, and wherein detecting that the first live content stream violates the content policy comprises identifying content in a first moderation category within the first live content stream based on the labeled content file.

16. The computing system of claim 15, wherein the executed instructions further cause the computing system to:

automatically perform, without user input, a second action in response to identifying content in a second moderation category, different from the first content moderation category, specified by the content policy within a second live content stream in the plurality of live content streams based on a second labeled content file generated for the second live content stream.

17. The non-transitory computer readable medium of claim 6, wherein the content policy specifies a set of moderation categories identified by the content moderation model, and wherein detecting that the first live content stream violates the content policy comprises identifying content in a first moderation category within the first live content stream based on the labeled content file.

18. The non-transitory computer readable medium of claim 17, wherein the executed instructions further cause the computing system to:

automatically perform, without user input, a second action in response to identifying content in a second moderation category, different from the first content moderation category, specified by the content policy within a second live content stream in the plurality of live content streams based on a second labeled content file generated for the second live content stream.

19. The method of claim 12, wherein the content policy specifies a set of moderation categories identified by the content moderation model, and wherein detecting that the first live content stream violates the content policy comprises identifying content in a first moderation category within the first live content stream based on the labeled content file.

20. The method of claim 19, further comprising:

automatically perform, without user input, a second action in response to identifying content in a second moderation category, different from the first content moderation category, specified by the content policy within a second live content stream in the plurality of live content streams based on a second labeled content file generated for the second live content stream.

\* \* \* \* \*